United States Patent [19]

Mackay et al.

[11] 4,085,227

[45] Apr. 18, 1978

[54] LONG-LASTING FLAVORED CHEWING GUM

[75] Inventors: Donald A. M. Mackay, Pleasantville; Frank Witzel, Spring Valley, both of N.Y.; Basant K. Dwivedi, Hopatcong; Daniel Schoenholz, Basking Ridge, both of N.J.

[73] Assignee: Life Savers, Inc., New York, N.Y.

[21] Appl. No.: 683,107

[22] Filed: May 4, 1976

Related U.S. Application Data

[63] Continuation-in-part of Ser. No. 577,589, May 15, 1975, and Ser. No. 577,590, May 15, 1975.

[51] Int. Cl.² .............................................. A23G 3/30
[52] U.S. Cl. ...................................... 426/3; 426/548; 426/804
[58] Field of Search ........................................ 426/3–6, 426/548, 804

[56] References Cited

U.S. PATENT DOCUMENTS

| 3,352,689 | 11/1967 | Bilotti | 426/3 |
| 3,826,847 | 7/1974 | Ogawa | 426/3 |

*Primary Examiner*—Jeanette M. Hunter
*Attorney, Agent, or Firm*—Lawrence S. Levinson; Merle J. Smith; Burton Rodney

[57] ABSTRACT

A flavored chewing gum is provided which contains a water-insoluble gum base, and one or more finely divided poorly water-soluble sweetening agents, such as the free acid form of saccharin and/or one or more finely divided poorly water-soluble food acids, such as fumaric acid, succinic acid or adipic acid, dispersed in the gum base. The finely divided sweetening agent and/or finely divided food acid undergo controlled release from the gum base for relatively long periods, for example, for 30 minutes or more, during which time the chewing gum delivers a balanced sweet and non-sour or sour taste.

32 Claims, No Drawings

LONG-LASTING FLAVORED CHEWING GUM

REFERENCE TO OTHER APPLICATIONS

This application is a continuation-in-part of applications Ser. Nos. 577,589 and 577,590 filed May 15, 1975.

FIELD OF THE INVENTION

The present invention relates to a long lasting flavored chewing gum having finely divided poorly water-soluble flavor such as sweetening agent and/or food acid dispersed in the gum base portion thereof.

BACKGROUND OF THE INVENTION

Conventional chewing gum generally includes gum base, water-soluble flavoring, such as mint (non-acid) or fruit (acid) flavors and water-soluble sweeteners, for example, various sugars and/or artifical sweeteners such as sodium or calcium saccharin. Such gum initially provides a desirable strong sweet taste which declines rapidly during the first 3 to 5 minutes of chewing to a very slight perceptible level of sweetness. The result is that after about five minutes of chewing all that remains in the mouth is an essentially tasteless wad which provides little in the way of flavor, aroma or sweetness. Furthermore, where sugar is present as the major sweetener, the problem of dental caries is of prime concern. Accordingly, there clearly is a need and long felt want for a chewing gum which possesses long-lasting flavor and/or sweetness and which does not contribute to dental caries.

DETAILED DESCRIPTION OF THE INVENTION

It has now been found that the flavor including sweetness and/or sour or other non-sour flavors of chewing gum can be prolonged by incorporating a finely divided poorly water-soluble sweetener, such as a non-sugar or artificial sweetener, and/or a finely divided poorly water-soluble food acid, in the gum base during the preparation of the gum, the sweetener and/or food acid having an average particle size of below about 150 microns (0.150 mm or about 100 mesh) and preferably below about 100 microns. The finely divided sweetener and/or finely divided food acid are substantially retained in the gum base, and during chewing undergo slow and controlled release into the saliva. The gum base will be poorly water-soluble or a water-impenetrable matrix.

The term "flavor" or "flavors" as employed herein, unless otherwise indicated includes sweeteners or food acids or other flavors.

It is well known the fine pulverization of crystals of poorly soluble materials or slowly dissolving materials of even good solubility increases surface area thereof, which, in turn, increases solubility rate. However, it has been surprisingly and unexpectedly found that finely divided non-sugar or artificial sweeteners, such as finely powdered free saccharin acid, and finely divided food acids, such as finely divided fumaric acid or other poorly water-soluble food acids, when incorporated into chewing gum base do just the opposite; the extraction rates of such sweeteners and food acids from the gum base during chewing are reduced with decreasing particle size so that the sweet taste and flavor of the gum are prolonged. The reason for this effect would seem to be that at the finer particle sizes, the sweetener and food acid are more completely protected from contact with saliva by the gum base. This results in controlled release of sweetener and food acid from the gum base.

A further feature of the present invention comprises a non-sour flavored chewing gum including the finely divided poorly water-soluble sweetener dispersed in the gum base and a fruit flavored, acid or sour chewing gum including the finely divided poorly water-soluble food acid dispersed in the gum base; the sour chewing gum also may optionally include a finely divided poorly water-soluble sweetener (such as the free acid form of saccharin). Furthermore, the chewing gums of the invention may optionally include a water-soluble sweetener, such as a sugar and/or polyol, a water-soluble saccharin salt or other synthetic water-soluble sweetener, water-soluble food acid and other flavorings.

It will be appreciated that the chewing gum of the invention may thus be formulated to provide a variety of different taste sensations. Thus, where the finely divided poorly water-soluble sweetener is employed in conjunction with water-soluble sweeteners and other flavors of the water-soluble type, the chewing gum will have a balanced sweet taste which will last for extended periods of time. Where the chewing gum includes the finely divided food acid employed in conjunction with water-soluble sweeteners and other water-soluble flavors, the chewing gum will have an initially balanced sweet-sour taste which tapers off to a sour taste. Where the chewing gum includes a mixture of finely divided poorly water-soluble food acid and finely divided poorly water-soluble sweetener and a mixture of water-soluble sweeteners and acid flavorings, the chewing gum will have a balanced sweet-sour taste which will last for extended periods of time.

Where a saccharin material (free acid form or salt) is employed as one of the sweeteners, alone or in combination with a sugar, in the chewing gum of the invention, it has been found that chewing of such gum actually inhibits formation of dental plaque. This effect is believed to be attributed to the presence of the saccharin material which has been found to be effective in inhibiting growth of *Streptococcus mutans* strains of bacteria which are responsible for plaque formation.

In yet another aspect of the present invention, a method is provided for forming a long-lasting flavored gum, which method includes the steps of admixing melted gum base with a plasticizer, such as a syrupy substance, for example corn syrup, or a modified starch syrup or sorbitol syrups, at a temperature ranging from about 180° to about 210° F, to form a base-syrup mix, optionally adding flavor oil to the mix, during the first five minutes of mixing admixing the base-syrup mix with a finely divided poorly water-soluble sweetener, such as saccharin in its free acid form, and/or a finely divided poorly water-soluble food acid, at a temperature below 250° F so as to inhibit formation of soluble salts, to form a continuous gum mass having the fine particles of sweetener and/or food acid intimately dispersed therein, and thereafter admixing the above mix with one or more easily extractable water-soluble sweeteners, water-soluble food acids and/or flavors. The resulting mix is then formed into sticks or tablets of chewing gum employing conventional techniques.

In carrying out the above method, the finely divided sweetener and/or finely divided food acid are poorly water-soluble so that the sweetener and/or acid will not dissolve in the plasticizer (which normally will be an aqueous plasticizer such as corn syrup) before they are transferred to the gum base. Regardless of the solubility of the sweetener and food acid, it is essential that the particles of sweetener and/or particles of acid have an average particle size of less than 150 microns.

By following the above procedure, the finely divided sweetener and/or finely divided food acid will be incorporated and retained in the gum base and will undergo controlled release in the mouth for periods of up to 30 minutes or more to provide concentrations of the sweetener below the bitter threshold thereof, but in sufficient amounts to provide a pleasant sweet taste and/or a pleasant sour taste to balance the sweet taste of the sweetener. It will thus be appreciated that the present invention provides a chewing gum and method for making the same wherein controlled release of sweetness and/or food acid is obtained without the requirement for coating, encapsulating, and/or integrating water-insoluble polymeric substances such as polyvinyl ester on to the particles of sweetener and/or other flavoring agents. This can be accomplished because of the very small particle sizes of the finely divided poorly water-soluble sweetener or food acid employed herein.

The finely divided slowly or poorly water-soluble sweeteners suitable for use herein include, for example, the free acid form of saccharin, dihydrochalcones, glycyrrhizin, L-aspartyl-L-phenylalanine methyl ester, and free cyclamic acid or mixtures of any two or more of the above, with the free acid form of saccharin being preferred.

The finely divided slowly or poorly water-soluble sweetener will be present in the chewing gum in amounts ranging from about 0.02 to about 1.0% by weight of the chewing gum, and preferably from about 0.1% to about 0.4% by weight of the chewing gum. Moreover, it is essential that the sweetener be in particulate form so that it may be readily mixed into the melted gum base and retained in the finished gum base to undergo controlled release in the mouth. Accordingly, the finely divided sweetener will generally have a particle size below about 150 microns (0.15 mm), and preferably below about 100 microns (0.1 mm). Use of free saccharin acid of the above-mentioned average particle size in the concentration range given above will also reduce the bitter aftertaste associated with such saccharin. Furthermore, in a preferred embodiment, the free saccharin acid employed will be prepared by the so-called "Maumee" process so that it will be substantially free of o-toluene sulfonamide (which has been found to add to the bitter taste of free saccharin acid).

The finely divided slowly or poorly water-soluble food acid component will preferably comprise fumaric, adipic or succinic acids having a particle size of below about 150 microns, preferably below about 100 microns, so that it may be easily dispersed in the gum base, with or without the finely divided slowly or poorly water-soluble sweetener, and be retained therein to undergo controlled release in the mouth. Generally, the chewing gum of the invention will contain from about 0.5% to about 3.5%, and preferably from about 1.5% to about 2.5% of finely divided food acid by weight of the chewing gum.

As indicated above, the chewing gum of the invention will also include gum base in an amount ranging from about 10 to about 50%, and preferably from about 15 to 30% by weight of the chewing gum composition.

In general, the gum base is prepared by heating and blending various ingredients, such as, natural gums, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadiene-styrene polymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The water-insoluble gum base may consist of any of the various bases disclosed for example in U.S. Pat. Nos. 3,052,552 and 2,197,719. Typical ingredients included in gum base compositions are the following:

| Base I | Parts by Weight |
| --- | --- |
| Ester gum | 88 |
| Rubber latex solids | 10 |
| Lecithin | 2 |
| Base II | |
| Chicle | 30 |
| Jelutong | 60 |
| Gutta soh | 8.5 |
| Lecithin | 2 |
| Base III | |
| Partially oxidized chicle | 98 |
| Lecithin | 2 |
| Base IV | |
| Jelutong (dry) | 80 |
| Gutta siak | 18 |
| Lecithin | 2 |

The chewing gum of the invention may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise oils derived from plants, leaves, flowers, fruit, etc. Representative flavor oils of this type include citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum of the invention with or without conventional preservatives.

Where liquid flavors are employed, they may be added to the gum base-syrup mix as in the case of the particulate food acid or particulate sweetener, that is, during the first five minutes of mixing, before a continuous mass of the gum base has been formed. Furthermore, after the water-soluble sweetener has been mixed in with the gum base, any of the above flavors, in the form of spray dried flavor with or without citric acid may be added.

In order to provide an initial taste or sensation of sourness, the chewing gum of the invention may also preferably contain an easily extractable food acid, for example a water-soluble food acid, such as citric acid, tartaric acid or malic acid, in an amount ranging from about 0.3 to about 2.0% by weight, and preferably from about 0.5 to about 1.2% by weight of the final gum product.

The chewing gum of the invention will optionally, and preferably, include an easily extractable sweetener in addition to the poorly water-soluble sweetener (where present), the easily extractable sweetener being present in an amount ranging from about 88 to about 0.05%, preferably from about 86 to about 40%, and more preferably from about 85 to about 70% by weight of the final product to provide an initial burst of sweetness. Such water-soluble sweeteners may include one or more sugars or sugar containing material, for example, monosaccharides, disaccharides and polysaccharides, some examples of which follow:

A. Monosaccharides of 5 or 6 carbon atoms — arabinose, xylose, ribose, glucose, mannose, galactose, fructose, dextrose, or sorbose or mixtures of two or more of the foregoing monosaccharides.

B. Disaccharides — sucrose such as cane or beet sugar, lactose, maltose or cellobiose; and C. Polysaccharides — partially hydrolyzed starch, dextrin or corn syrup solids.

In a preferred embodiment, sorbitol will be included in combination with sugar as the water-soluble sweetener. In such case, the sorbitol will be present in an amount within the range of from about 2 to about 20% by weight of the chewing gum composition, preferably from about 5 to about 15%, and optimally from about 8 to about 12%.

Furthermore, any of the water-soluble natural sweeteners set out hereinbefore as well as water-soluble artificial sweeteners such as sodium or calcium saccharin salts, cyclamate salts, and the like may be present together with the finely divided poorly water-soluble sweetener. In each of the preferred embodiments of the chewing gum and method of the invention, corn syrup may be employed as the plasticizer. However, satisfactory results may be obtained, for example, by employing sorbitol, sorbitol syrups, modified starches and the like, without the use of and presence of sucrose and/or corn syrup in the chewing gum.

Generally, in forming a preferred embodiment of the chewing gum of the invention, the poorly water-soluble saccharin will be employed in a weight ratio to the easily extractable (water-soluble) sweetener within the range of from about 0.00022:1 to about 20:1 and preferably within the range of from about 0.0011:1 to about 0.01:1.

The chewing gum of the invention may also contain softeners, fillers and texturizers, such as hydrated alumina, plasticizers, emulsifiers, F.D.&C. coloring agents, and other conventional chewing gum additives as will be apparent to those skilled in the art.

It will be appreciated that the finely divided slowly or poorly water-soluble sweetener and/or finely divided slowly or poorly water-soluble food acids will be dispersed in the oil phase or gum base itself and will provide long lasting sweetness and/or sourness, whereas the easily extractable (water-soluble) sweeteners, easily extractable (water-soluble) food acids and fruit flavors or other flavors, will comprise the water-soluble portion of the chewing gum and will provide the initial burst of sweetness, sourness and flavor.

The following Examples illustrate preferred embodiments of the present invention without, however, limiting the same thereto. All temperatures are expressed in ° F.

EXAMPLE 1

A long lasting cherry flavor chewing gum is prepared from the following ingredients:

| Ingredients | Parts by Weight |
| --- | --- |
| Gum Base | 20 |
| Sugar | 50 |
| Corn Syrup | 16 |
| Dextrose | 10 |
| Lecithin | 0.2 |
| Citric acid | 0.5 |
| Fumaric acid (passes through a U.S. 140 mesh screen) | 2 |
| Free saccharin acid (passes through a U.S. 140 mesh screen) | 0.2 |
| Artificial cherry flavor | 1 |
| Gum arabic coated cherry flavor | 1.5 |

The gum base is melted (temperature 270°) and placed in a standard dough mixer kettle equipped with sigma blades. The corn syrup and lecithin are added and mixed for 2 minutes at 200°. At the time the mix is folding well, powdered free saccharin and powdered fumaric acid are added to the base-syrup mix and the mixture is mixed for 1 minute at 200°. Thereafter, the sucrose, dextrose, flavor oil, citric acid, and coloring agents are added and blended with the above mixture for 5 minutes at 160°. The resulting gum is discharged from the kettle and formed into gum sticks employing conventional techniques.

The chewing gum product obtained is found to have a pleasant balanced sweet-sour taste for up to 30 minutes and more without the bitter aftertaste normally associated with free saccharin acid.

EXAMPLES 2 AND 3

Following the procedure of Example 1, two cherry chewing gum formulations in accordance with the present invention and one control formulation having the following compositions are prepared:

TABLE 2

| | CHERRY CHEWING GUM | | |
| --- | --- | --- | --- |
| | Parts by Weight | | |
| Ingredients | Control A | Ex. 2 | Ex. 3 |
| Gum Base | 20 | 20 | 20 |
| Sucrose | 49.8 | 38.6 | 38.6 |
| Dextrose | 10 | 10 | 10 |
| Corn Syrup | 16 | 16 | 16 |
| Lecithin | 0.2 | 0.2 | 0.2 |
| Sorbitol | — | 10 | 10 |
| Free Saccharin (passes through a U.S. 140 mesh screen) | — | 0.2 | 0.2 |
| Artificial cherry flavor | 1 | 1 | 1 |
| Gum arabic coated cherry flavor | 1.5 | 1.5 | 1.5 |
| Citric Acid | 1.5 | 1 | 0.5 |
| Fumaric Acid (passes through a U.S. 140 mesh screen) | — | 1.5 | 2.0 |

In preparing the above compositions, the sucrose, dextrose and sorbitol, where present, are added at approximately the same time.

In order to evaluate the control A composition containing no free saccharin and no fumaric acid against the Examples 2 and 3 compositions of the invention, a trained sensory panel tested the above compositions for taste, flavor and overall quality as defined below:

Taste: This attribute is used in reference to sweet, sour, salty bitter, metallic, cool and hot (burning) sensations perceived by the tongue.

Flavor: It refers to a combination of taste and odor sensations as perceived by the tongue and olfactory cells.

Overall quality: The overall desirability or undesirability of the product as judged by the sensory panel members using their own judgment. The results obtained are set out in Table 3 below:

TABLE 3
EVACULATION OF CHERRY FLAVORED CHEWING GUM CONTAINING FREE SACCHARIN ACID

Scale:  1 = dislike extremely      5 = neither like nor dislike
        3 = dislike moderately     7 = like moderately
        9 = like extremely

| | | SENSORY SCORE | | |
|---|---|---|---|---|
| Example No. | | Control A | Ex. 2 | Ex. 3 |
| Attribute | Time (min.) | | | |
| | 2 | 5.6 | 6.6 | 6.8 |
| | 4 | 5.0 | 5.8 | 6.0 |
| | 6 | 4.6 | 5.0 | 5.8 |
| Taste | 10 | 4.6 | 4.8 | 5.4 |
| | 15 | 4.8 | 4.4 | 5.4 |
| | 20 | 4.8 | 4.4 | 5.4 |
| | 30 | 4.6 | 4.4 | 5.2 |
| | 2 | 5.4 | 6.6 | 6.4 |
| | 4 | 5.0 | 5.8 | 6.0 |
| | 6 | 4.4 | 5.0 | 5.8 |
| Flavor | 10 | 4.6 | 4.8 | 5.4 |
| | 15 | 4.6 | 4.8 | 5.4 |
| | 20 | 4.6 | 4.8 | 5.4 |
| | 30 | 4.4 | 4.8 | 5.4 |
| | 2 | 6.0 | 7.0 | 6.8 |
| | 4 | 5.8 | 6.4 | 6.4 |
| Overall | 6 | 5.4 | 5.6 | 6.4 |
| Quality | 10 | 5.4 | 5.8 | 6.0 |
| | 15 | 5.4 | 5.6 | 6.0 |
| | 20 | 5.4 | 5.6 | 6.0 |
| | 30 | 5.2 | 5.4 | 5.8 |

The results set out in Table 3 clearly demonstrate that the taste, flavor and overall quality of the chewing gum of the invention (Examples 2 and 3) are materially and significantly superior to the control A formulation which does not include the free saccharin acid and fumaric acid dispersed in the gum base.

EXAMPLE 4

A long lasting cherry flavor chewing gum is prepared from the following ingredients employing a procedure similar to that described in Example 1.

TABLE 4

| | Parts by Weight |
|---|---|
| Gum base | 20 |
| Sugar | 48.19 |
| Corn syrup | 16 |
| Dextrose | 10 |
| Lecithin | 0.2 |
| Citric acid | 0.5 |
| Fumaric acid (passes through a U.S. 140 mesh screen) | 2 |
| Free-acid saccharin (passes through a U.S. 140 mesh screen) | 0.2 |
| Artificial cherry oil | 1 |
| Gum arabic coated cherry oil | 1.50 |

In order to evaluate the control B composition having a similar composition as Control A and containing no free saccharin and no fumaric acid against the Example 4 composition of the invention, a trained sensory panel tested the above compositions for sweetness, sourness, cherry aroma and overall quality. The results obtained are set out in Table 5 below.

TABLE 5
EVALUATION OF CHERRY FLAVORED GUM CONTAINING FREE-SACCHARIN

| Attribute | Time (min.) | Control B | Example 4 |
|---|---|---|---|
| | 1 | 6.8 | 6.8 |
| | 3 | 4.8 | 5.5 |
| | 5 | 3.0 | 4.5 |
| Sweetness | 10 | 1.4 | 3.8 |
| | 15 | 1.0 | 3.5 |
| | 20 | 1.0 | 2.8 |
| | 30 | 1.0 | 2.8 |
| | 1 | 7.4 | 7.4 |
| | 3 | 4.4 | 6.0 |
| | 5 | 3.2 | 4.8 |
| Sourness | 10 | 2.2 | 3.5 |
| | 15 | 1.8 | 3.3 |
| | 20 | 1.4 | 2.8 |
| | 30 | 1.4 | 2.8 |
| | 1 | 7.4 | 7.8 |
| | 3 | 4.6 | 6.0 |
| Cherry | 5 | 3.4 | 5.5 |
| Aroma | 10 | 2.2 | 5.5 |
| | 15 | 1.8 | 4.0 |
| | 20 | 1.6 | 3.8 |
| | 30 | 1.4 | 3.5 |
| | 1 | 7.0 | 6.8 |
| | 3 | 6.2 | 6.8 |
| Overall | 5 | 5.2 | 6.3 |
| Quality | 10 | 4.0 | 6.0 |
| | 15 | 3.4 | 6.0 |
| | 20 | 3.2 | 5.5 |
| | 30 | 2.8 | 5.5 |

Sensory Scales
1. Sweetness, coolness, cherry aroma:
   1 = imperceptible,
   3 = moderately perceptible
   5 = perceptible
   7 = moderately pronounced
   9 = very pronounced
2. Overall Quality:
   1 = very undesirable
   3 = moderately undesirable.
   5 = neutral
   7 = moderately desirable
   9 = very desirable The results set out in Table 5 clearly demonstrate that the sweetness, sourness, aroma, and overall quality of the chewing gum of the invention (Example 4) are materially and significantly superior to the control B formulation which does not include the free saccharin acid and fumaric acid dispersed in the gum base.

EXAMPLE 5

A long-lasting peppermint flavor chewing gum is prepared from the following ingredients:

| | Parts by Weight |
|---|---|
| Gum base | 20 |
| Corn syrup, 44° Be' | 17 |
| Powdered free saccharin acid (pulverized to pass through a U.S. 140 mesh screen) | 0.2 |
| Powdered Sugar (sucrose) | 50 |
| Dextrose | 10 |
| Peppermint oil | 1 |
| Lecithin | 0.2 |

The gum base is melted (temperature 270°) and placed in a standard dough mixer kettle equipped with sigma blades. The corn syrup and lecithin are added and mixed for 2 minutes at 200°. At the time the mix is folding well, powdered free saccharin is added and the mixture is mixed another 3 minutes at 200°. Thereafter, the sucrose, dextrose and flavor oil are added during which time the mixture is mixed for 5 minutes. The gum is then discharged from the kettle, cut into 25 lb. loaves and allowed to cool to 90°–120° F. It is then rolled to a thickness of 0.178 cm on a standard Gimpel machine and scored into strips 7.26 cm wide and 41.9 cm long, and cooled for 12-18 hours.

The chewing gum product obtained is found to have a pleasant sweet taste for up to 30 minutes and more without the bitter aftertaste normally associated with free saccharin acid.

EXAMPLES 6 to 9

Following the procedure of Example 5, four peppermint chewing gum formulations in accordance with the present invention and one control formulation having the following compositions are prepared:

TABLE 1

PEPPERMINT CHEWING GUM

| | Parts by Weight | | | | |
|---|---|---|---|---|---|
| Example No. | Control C | 6 | 7 | 8 | 9 |
| Ingredients | | | | | |
| Base | 20 | 20 | 20 | 20 | 20 |
| Sucrose | 60.8 | 50.6 | 25.5 | 25.6 | 25.55 |
| Dextrose | — | — | 25 | — | — |
| Sorbitol | — | 10 | 10 | 10 | 10 |
| Anhydrous Dextrose | — | — | — | 25 | 25 |
| Corn Syrup | 18 | 18 | 18 | 18 | 18 |
| Lecithin | 0.2 | 0.2 | 0.2 | 0.2 | 0.2 |
| Peppermint Oil | 1 | 1 | 1 | 1 | 1 |
| Free Saccharin Acid (micronized - passes through a U.S. 140 screen) | — | 0.2 | 0.3 | 0.2 | 0.25 |

In preparing the above compositions, the sucrose, dextrose, anhydrous dextrose and sorbitol (where present) are added at approximately the same time.

In order to evaluate the control C composition containing no free saccharin against the Examples 6–9 composition of the invention, a trained sensory panel tested the above compositions for taste, flavor and overall quality, as defined hereinbefore.

TABLE 6

EVALUATION OF PEPPERMINT FLAVORED CHEWING GUM CONTAINING FREE-SACCHARIN

Scale: 1 = dislike extremely.
3 = dislike moderately.
5 = neither like nor dislike.
7 = like moderately.
9 = like extremely.

| | | SENSORY SCORE | | | | |
|---|---|---|---|---|---|---|
| Example No. | | Control C | 6 | 7 | 8 | 9 |
| Attribute | Time (minutes) | | | | | |
| | 2 | 7.2 | 7.2 | 6.2 | 7.2 | 7.2 |
| | 4 | 5.6 | 6.4 | 5.6 | 6.8 | 6.6 |
| | 6 | 5.2 | 5.8 | 5.0 | 6.4 | 6.2 |
| Taste | 10 | 4.2 | 5.4 | 4.8 | 5.8 | 5.6 |
| | 15 | 3.6 | 5.2 | 4.8 | 5.4 | 5.4 |
| | 20 | 3.6 | 5.2 | 5.0 | 5.6 | 5.4 |
| | 30 | 3.2 | 5.0 | 5.0 | 5.2 | 5.2 |
| | 2 | 7.2 | 7.2 | 6.0 | 7.2 | 7.2 |
| | 4 | 6.0 | 6.4 | 5.8 | 6.8 | 7.0 |
| | 6 | 5.4 | 6.0 | 5.6 | 6.2 | 6.8 |
| Flavor | 10 | 4.4 | 5.8 | 5.0 | 6.2 | 6.0 |
| | 15 | 3.6 | 5.8 | 5.2 | 5.8 | 5.4 |
| | 20 | 3.6 | 5.6 | 5.4 | 5.8 | 5.2 |
| | 30 | 3.4 | 5.4 | 5.4 | 5.2 | 5.2 |
| | 2 | 7.4 | 7.4 | 6.4 | 7.0 | 7.2 |
| | 4 | 6.4 | 7.0 | 6.0 | 6.8 | 7.0 |
| Overall | 6 | 5.8 | 6.4 | 5.6 | 6.4 | 7.0 |
| Quality | 10 | 4.6 | 5.8 | 5.2 | 6.2 | 6.6 |
| | 15 | 4.4 | 5.8 | 5.2 | 5.8 | 6.0 |
| | 20 | 4.4 | 5.8 | 5.4 | 6.0 | 6.0 |
| | 30 | 4.0 | 5.6 | 5.2 | 5.8 | 5.8 |

The results set out in Table 6 clearly demonstrate that the taste, flavor and overall quality of the chewing gum of the invention (Examples 6 to 9) are materially and significantly superior to the control C formulation which does not include the free saccharin acid and dispersed in the gum base.

EXAMPLE 10

A long-lasting spearmint flavor chewing gum is prepared from the following ingredients:

| | Parts by Weight |
|---|---|
| Gum Base | 20 |
| Sugar (sucrose) | 52 |
| Corn Syrup 44 Be' | 17 |
| Dextrose | 10 |
| Lecithin | 0.2 |
| Free saccharin (powered - passes through a 140 U.S. mesh screen) | 0.2 |
| Spearmint oil | 0.6 |

The gum base is melted (temperature 270°) and placed in a standard dough mixer kettle equipped with sigma blades. The corn syrup and lecithin are added and mixed for 2 minutes at 200°. At the time the mix is folding well, powdered free saccharin and flavor oil are mixed for 1 minute at 200°. Thereafter, the sucrose, dextrose and coloring agents are added and blended with the above mixture for 5 minutes at 160°. The resulting gum is discharged from the kettle and formed into gum sticks as described in Example 1.

The chewing gum product obtained is found to have a pleasant sweet taste for up to 30 minutes and more without the bitter aftertaste normally associated with free saccharin acid.

EXAMPLE 11

Following the procedure of Example 10, a spearmint chewing gum formulation in accordance with the present invention and one control formulation having the following composition are prepared:

TABLE 7

SPEARMINT CHEWING GUM

| | Parts by Weight | |
|---|---|---|
| Example No. | Control D | 11 |
| Indredients | | |
| Gum Base | 20 | 20 |
| Sucrose | 38 | 38 |
| Dextrose | 10 | 10 |
| Corn Syrup | 17 | 17 |
| Lecithin | 0.2 | 0.2 |
| Sorbitol | 10 | 10 |
| Free Saccharin Acid (passed through a 140 U.S. mesh screen) | — | 0.2 |
| Spearmint oil | 0.6 | 0.6 |

In preparing the above compositions, the sucrose, dextrose and sorbitol are added at approximately the same time.

In order to evaluate the control D composition containing no free saccharin against the Example 7 composition of the invention, a trained sensory panel tested the above compositions for sweetness, coolness, spearmint aroma, and overall quality. The results obtained are set out in Table 8 below

TABLE 8
EVALUATION OF SPEARMINT FLAVORED CHEWING GUM CONTAINING INSOLUBLE FORM OF SACCHARIN

| | | Sensory Score | |
|---|---|---|---|
| Example No. | | Control D | 11 |
| Attributes | Time (Min.) | | |
| Sweetness 1. | 1 | 6.0 | 6.4 |
| | 3 | 4.2 | 4.2 |
| | 5 | 2.4 | 3.0 |
| | 10 | 1.0 | 2.4 |
| | 15 | 1.0 | 2.2 |
| | 20 | 1.0 | 1.8 |
| | 30 | 1.0 | 1.8 |
| Coolness 1. | 1 | 4.6 | 4.6 |
| | 3 | 3.4 | 3.4 |
| | 5 | 2.4 | 2.6 |
| | 10 | 1.2 | 2.4 |
| | 15 | 1.2 | 2.6 |
| | 20 | 1.2 | 2.6 |
| | 30 | 1.2 | 2.2 |
| Spearmint 1. Aroma | 1 | 5.2 | 6.2 |
| | 3 | 3.8 | 4.4 |
| | 5 | 2.6 | 3.6 |
| | 10 | 1.8 | 3.2 |
| | 15 | 1.4 | 3.0 |
| | 20 | 1.2 | 2.6 |
| | 30 | 1.2 | 2.6 |
| Overall 2. Quality | 1 | 6.6 | 7.2 |
| | 3 | 5.8 | 6.2 |
| | 5 | 5.2 | 5.6 |
| | 10 | 4.0 | 5.2 |
| | 15 | 4.0 | 5.4 |
| | 20 | 3.4 | 5.4 |
| | 30 | 3.4 | 5.4 |

Sensory Scales
1. Sweetness, coolness, spearmint aroma:
   1 = imperceptible,
   3 = moderately perceptible
   5 = perceptible
   7 = moderately pronounced
   9 = very pronounced
2. Overal Qualtiy:
   1 = very undesirable
   3 = moderately undesirable
   5 = neutral
   7 = moderately desirable
   9 = very desirable The results set out in Table 8 clearly demonstrate that the sweetness, coolness, aroma and overall quality of the chewing gum of the invention (Example 11) are materially and significantly superior to the control D formulation which does not include the free saccharin acid dispersed in the gum base.

What is claimed is:

1. A flavored chewing gum having a prolonged sweet taste comprising gum base; and from about 0.02 to about 1.0% by weight of a particulate artificial sweetener having an average particle size below about 150 microns dispersed in said gum base, said sweetener being the free acid form of saccharin.

2. The flavored chewing gum as defined in claim 1 wherein said sweetener is in the form of finely ground particles having a particle size of below about 100 microns.

3. A flavored chewing gum having a prolonged sweet taste comprising gum base; from about 0.02 to about 1.0% by weight of the free acid form of saccharin in fine particulate form dispersed in said gum base; and other flavoring.

4. The flavored chewing gum as defined in claim 3 further including from about 0.05 to about 88% by weight of one or more water-soluble sweetening agents.

5. A flavored chewing gum having a prolonged sweet taste comprising gum base, from about 0.01 to about 1.0% by weight of a particulate poorly water-soluble artificial sweetener having an average particle size below about 150 microns, and sweetener being the free acid form of saccharin and further being dispersed in said gum base, and other flavoring.

6. The flavored chewing gum as defined in claim 5 further including from about 0.05 to about 88% by weight of one or more water-soluble sweetening agents.

7. The flavored chewing gum as defined in claim 6 wherein said water-soluble sweetening agents comprises sorbitol.

8. The flavored chewing gum as defined in claim 7 wherein said water-soluble sweetening agent further includes sucrose.

9. The flavored chewing gum as defined in claim 5 comprising gum base, free saccharin acid as the particulate artificial sweetener present in an amount ranging from about 0.1 to about 0.3% by weight, sorbitol, dextrose and corn syrup.

10. The flavored chewing gum as defined in claim 8 wherein the poorly water-soluble saccharin is employed in a weight ratio to the water-soluble sweetener within the range of from about 0.00022:1 to about 20:1.

11. The flavored chewing gum as defined in claim 5 wherein said saccharin has a solubility in water of less than 0.5 g/100 pts of $H_2O$ at 77° F.

12. The flavored chewing gum as defined in claim 3 wherein said free acid form of saccharin is present in an amount within the range of from about 0.1 to about 0.3% by weight.

13. The flavored chewing gum as defined in claim 3 wherein said flavoring comprises essential or synthetic oils.

14. A method for forming a flavored chewing gum as defined in claim 3, which comprises admixing melted gum base with a plasticizer or syrup at a temperature ranging from about 180° to about 210° F to form a base-syrup mix, and at a time the mix is folding well, admixing the base-syrup mix with said free saccharin acid at a temperature below about 250° F so as to inhibit formation of soluble saccharin salts, and thereafter forming the above mix into sticks or tablets.

15. The method as defined in claim 14 wherein said plasticizer comprises corn syrup.

16. The method as defined in claim 14 further including the step of admixing the base-syrup-free saccharin acid mix with one or more water-soluble sweeteners prior to forming the sticks or tablets.

17. The flavored chewing gum as defined in claim 5 further including a poorly water-soluble food acid having an average particle size of less than about 150 microns.

18. The flavored chewing gum as defined in claim 17 further including a water-soluble food acid.

19. The flavored chewing gum as defined in claim 1 further including from about 0.5 to about 3.5% by weight of a poorly water-soluble food acid having an average particle size of less than about 150 microns.

20. The flavored chewing gum as defined in claim 19 further including a water-soluble food acid.

21. The flavored chewing gum as defined in claim 3 further including a poorly water-soluble food acid in fine particulate form.

22. The flavored chewing gum as defined in claim 21 further including from about 0.05 to about 88% by weight of one or more water-soluble sweetening agents.

23. The flavored chewing gum as defined in claim 3 further including from about 0.05 to about 88% by weight of one or more water-soluble sweetening agents.

24. The flavored chewing gum as defined in claim 23 wherein said water-soluble sweetening agent comprises sorbitol.

25. The flavored chewing gum as defined in claim 24 wherein said water-soluble sweetening agent further includes sucrose.

26. The flavored chewing gum as defined in claim 17 comprising gum base, free saccharin acid as the particulate artificial sweetener present in an amount ranging from about 0.1 to about 0.3% by weight, particulate food acid selected from the group consisting of fumaric acid, succinic acid and adipic acid, and further including sorbitol, dextrose and corn syrup.

27. The flavored chewing gum as defined in claim 17 wherein said poorly water-soluble food acid is selected from the group consisting of fumaric acid, adipic acid or succinic acid.

28. The flavored chewing gum as defined in claim 22 wherein said particulate artificial sweetener is in a weight ratio to the water-soluble sweetening agent within the range of from about 0.00022:1 to about 0.0125:1.

29. The flavored chewing gum as defined in claim 28 wherein said water-soluble sweetening agent is selected from the group consisting of sugars, water-soluble saccharin salts, dipeptide based sweeteners and cyclamates.

30. The flavored chewing gum as defined in claim 18 wherein said water soluble acid comprises citric, tartaric or malic acid alone or in combination with a natural or synthetic fruit flavoring.

31. A method for forming a flavored chewing gum as defined in claim 17, which comprises admixing melted gum base with a plasticizer or syrup at a temperature ranging from about 180° to about 210° F to form a base-syrup mix, and at a time the mix is folding well admixing the base-syrup mix with said free saccharin acid and particulate food acid at a temperature below about 250° F so as to inhibit formation of soluble saccharin salts, admixing the above mix with one or more water soluble sweeteners, water soluble food acids or fruit flavors, and thereafter forming the above mix into sticks or tablets.

32. The method as defined in claim 31 wherein said plasticizer comprises corn syrup.

* * * * *

UNITED STATES PATENT AND TRADEMARK OFFICE
CERTIFICATE OF CORRECTION

PATENT NO. : 4,085,227
DATED : April 18, 1978
INVENTOR(S) : Donald A. M. Mackay

It is certified that error appears in the above–identified patent and that said Letters Patent are hereby corrected as shown below:

Column 10, line 5, delete the word "and".
Column 12, line 3, "and" should read --said--.
Column 12, line 10, "agents" should read --agent--.

Signed and Sealed this

Eighth Day of August 1978

[SEAL]

Attest:

RUTH C. MASON
*Attesting Officer*

DONALD W. BANNER
*Commissioner of Patents and Trademarks*